United States Patent [19]

Nash

[11] 4,163,764
[45] Aug. 7, 1979

[54] COUPLED BLOCK COPOLYMERS WITH IMPROVED TACK FOR ADHESIVES

[75] Inventor: Larry L. Nash, Borger, Tex.

[73] Assignee: Phillips Petroleum Company, Bartlesville, Okla.

[21] Appl. No.: 809,360

[22] Filed: Jun. 23, 1977

[51] Int. Cl.$^2$ ............................................. C08F 297/04
[52] U.S. Cl. .................................. 525/2; 260/27 BB; 525/342; 525/289; 525/272; 525/314; 525/382; 525/93; 525/122; 525/123; 525/153; 525/154; 525/359; 525/386
[58] Field of Search ......................... 260/880 B, 876 B

[56] References Cited

U.S. PATENT DOCUMENTS

| 3,352,944 | 11/1967 | Wheat | 260/876 B |
| 3,639,517 | 2/1972 | Kitchen | 260/880 B |
| 3,906,057 | 9/1975 | Durst | 260/876 B |
| 3,985,830 | 9/1976 | Fetters | 260/880 B |
| 4,051,197 | 9/1977 | Fodor | 260/876 B |

FOREIGN PATENT DOCUMENTS 997889 9/1976 Canada .

Primary Examiner—Paul R. Michl

[57] ABSTRACT

A monovinyl arene, such as styrene, is polymerized with a monofunctional lithium initiator, followed by addition of a conjugated diene, such as butadiene, with additional monofunctional lithium initiator. The resultant block copolymers are coupled to give linear coupled block copolymers or radial coupled block copolymers with a random distribution of homopolymer and copolymer branches. The polymers exhibit increased tack and improved creep resistance in adhesive compositions. The amount of initiator added as the second increment with the second monomer must be greater than the amount added as the first increment with the first monomer.

28 Claims, No Drawings

COUPLED BLOCK COPOLYMERS WITH IMPROVED TACK FOR ADHESIVES

FIELD OF THE INVENTION

The invention pertains to coupled block polymers and processes for making them. In another aspect, the invention relates to adhesive formulations incorporating the coupled block copolymers.

BAKCGROUND OF THE INVENTION

There is a continuing and growing demand for polymers to meet ever heavier duties in adhesive formulations. Among the requirements are increased tack and better creep resistance for adhesive compositions.

BRIEF SUMMARY OF THE INVENTION

I have discovered that linear coupled block copolymers, linear and radial, prepared by a particular process exhibit increased tack and improved creep resistance in adhesive formulations.

The process that I have discovered polymerizes a monovinyl arene, such as styrene, with a monofunctional lithium initiator, then adds to the still living polymerizations system a second monomer selected from conjugated dienes together with a further portion of initiator, and it is important that the second portion of initiator be greater than the first portion, polymerizes to substantially complete conversion, and then couples to form a coupled block copolymer which can be either linear or or radial. This particular process produces a unique polymeric product or composition which exhibits desirable properties when formulated into adhesive compositions.

It is important in the preparation as just described that the second increment of lithium initiator added coincidentally with or prior to the addition of the conjugated diene be in an amount at least greater than the amount first employed in the polymerization of the first monomer, the monovinyl arene. I have discovered that if the second increment is smaller than the first, that the resultant product, quite surprisingly, is greatly inferior in adhesive properties.

DETAILED DESCRIPTION OF THE INVENTION

First Monomer

Monovinyl Arene

The first monomer polymerized in accordance with the process of my invention to produce the copolymeric product in my invention and ultimately the adhesives of my invention is a monovinyl arene or monovinyl-substituted aromatic compound. These monovinyl-substituted aromatic compounds typically contain 8 to 12 carbon atoms per molecule for convenience and availability, and of these styrene is the most readily commercially available monomer. Exemplary species include the presently preferred styrene, as well as the vinylnaphthalenes such as 1-vinylnaphthalene or 2-vinylnaphthalene; various of the alkyl-substituted styrenes such as 3-methylstyrene, 4-propylstyrene, and the like, alone, or in admixture.

Polymerization-First Stage

The polymerization preferably is carried out employing a hydrocarbon diluent which can be one or more of the aromatic, paraffinic, or cycloparaffinic compounds, presently preferably for availability one or more of those containing in the range of 4 to 10 carbon atoms per molecule and which is a liquid under the conditions of the polymerization process in accordance with the temperature/pressure relationship employed. Exemplary diluents include butane, pentane, isooctane, cyclohexane, benzene, toluene, xylene, ethylbenzene, hexane, and the like, alone or in admixture, of which presently preferred is cyclohexane.

Polymerization temperatures can vary over a broad range as is known and practiced for anionic solution polymerizations of the type of monomer employed. On an exemplary basis, a polymerization temperature in the range of about $-20°$ C. to $150°$ C. is satisfactory, although a polymerization temperature in the range of about $30°$ C. to $125°$ C. presently is considered preferred. The pressure employed can range widely, as convenient, preferably being sufficient to maintain substantially liquid phase conditions in the reaction zone.

The initiator employed in the process in accordance with my invention is a hydrocarbylmonolithium initiator, and other than this limitation can be any of those known for solution polymerization of the type of monomers as described herein.

Exemplary hydrocarbylmonofunctional initiators or compounds include ethyllithium, isopropyllithium, n-butyllithium, sec-butyllithium, tert-octyllithium, n-eicosyllithium, phenyllithium, 2-napthyllithium, 4-butylphenyllithium, 4-tolyllithium, 4-phenylbutyllithium, cyclohexyllithium, and the like, alone, or in admixture, but presently preferred are the n-butyllithium and sec-butyllithium species for availability and convenience, and of these most preferred is n-butyllithium for a monovinyl arene initial homopolymerization.

The amount of hydrocarbylmonolithium initiator employed can range widely, as desired, depending on the molecular weight desired for the initial polystyrene block formation, since the molecular weight is substantially inversely proportional to the number of lithium atoms initially present, after subtracting any minor consumption of hydrocarbylmonolithium initiator by traces of initiator poisons which may accompany the monomer, diluent, or reactor means. Other than the amount necessary to compensate for any traces of initiator poison originally present, the amount of initiator employed can range widely, such as from about 0.001 to 3, presently preferably about 0.01 to 0.3, phm, parts by weight per 100 parts of monomer.

In homopolymerizations of a monovinyl arene such as styrene, it frequently is convenient and desirable, indeed preferable, to include a small amount of a polar organic compound to assist in initiation and polymerization of the monovinyl arene. Organic compounds known in the art for this purpose can be employed, particularly including the hydrocarbyl ethers and tertiary amines. Such polar compounds, particularly ethers such as tetrahydrofuran or diethyl ether, may also later affect the vinyl unsaturation content of the subsequently polymerized conjugated diene, particularly such as butadiene.

The amount of such polar organic compound employed can range widely, though an exemplary amount is in the range of about 0.001 to 10, preferably about 0.01 to 1, phm.

In the first polymerization stage or step, the diluent, monomer, polar organic compound employed, and initiator are added to the polymerization reactor means, and the resulting polymerization admixture then brought to desired polymerization temperature to polymerize the monomer or monomers to substantially complete conversion, and the polymerization can be conducted over a time of about 1 min. to 10 hr., preferably about 10 min. to 2 hr., as may be convenient or desired, to achieve preferably substantially complete conversion.

Second Stage

Second Monomer

The second monomer employed is a conjugated diene, and the conjugated diene preferably is a hydrocarbon conjugated diene, most preferably those of 4 to 8 carbon atoms per molecule for commercial purposes, and presently most preferred for similar reasons are butadiene and isoprene, and of these we still particularly prefer butadiene.

Exemplary species include the just mentioned 1,3-butadiene, isoprene, and as well 2,3-dimethyl-1,3-butadiene, piperylene, 1,3-hexadiene, 3,4-dimethyl-1,3-hexadiene, 1,3-octadiene, alone, or in admixture.

The desired amount or proportion of the second monomer, the conjugated diene, is added to the polymerization admixture resulting from the first polymerization stage upon substantially complete conversion of the monovinylarene monomer employed therein.

The relative amount of conjugated diene or dienes, versus the monovinyl aromatic compound or compounds employed originally, can vary over a wide range. The proportion should be such as to produce a substantially rubbery copolymer as a final product. In preparing rubbery copolymers, the proportion of conjugated diene versus monovinyl arene should be sufficient as to result in a substantially rubbery or elastomeric copolymer product. There is no sharp break point as to the amount of conjugated diene versus monovinyl arene that confers rubber elastomeric properties on the resulting copolymer, though in general at least about 50 parts by weight of conjugated diene per 100 parts by weight total monomers are required on an exemplary basis. Thus, for a rubbery copolymer, as is preferred in accordance with my invention, the weight ratio of conjugated diene:monovinyl arene would be in the range of about 50:50 to 95:5. It has been found that the weight ratio of the conjugated diene:monovinyl arene preferably should be about 85:15 to 70:30, and presently most preferred is a ratio of about 80:20.

Along with the addition of the conjugated diene to the polymerization admixture resulting from the first polymerization stage is added a further increment or amount of hydrocarbyl monolithium initiator. It is important that the amount of initiator employed in the second increment or second charge be greater than the amount employed in the first increment or charge with the first monomer. Generally, the amount of initiator added in the second stage or increment is from one percent by weight to 400 percent by weight greater than the amount of initiator in the first stage, or increment, preferably 10 to 300 percent by weight greater. The second increment preferably is about 0.01 phm greater. Otherwise, the results in accordance with my invention are not obtainable. The amount so employed can range widely, from such as about 0.001 to 3, more preferably about 0.01 to 0.3, phm.

The second polymerization step is conducted in substantially the same fashion as described hereinabove for the first polymerization step so far as temperature, pressure, time, and the like, are concerned. Generally, no further diluent need be employed, though such is not precluded, if desired.

Third Step

Termination (Coupling)

At the end of substantially complete polymerization of the first step or stage the product is an admixture of living polymonovinylarene chains each terminated with a lithium atom. The addition of the conjugated diene and further initiator then results in at least two reactions, a polymerization of the conjugated diene onto the living polymonovinyl arene chains thus resulting in a polymonovinyl arene block-polyconjugated diene block-lithium, together with homopolymerization of some of the conjugated diene due to the further monofunctional lithium initiator added to result in certain amounts of polybutadienelithium being present. The resulting material is an admixture of di-block polymer-lithium, and mono-block polymer-lithium.

This resulting admixture is treated by means of a coupling agent to produce an admixture of linear coupled blocks, or an admixture of radial coupled blocks, depending on the effective functionality of the coupling agent employed.

In my use of the term "coupling" as herein employed, the term is a broad generic term meaning the bringing together and joining by means of a central coupling atom or coupling moiety two or more of the living lithium-terminated polymer chains.

A wide variety of compounds suitable for such purposes can be employed. Among the suitable branching agents are the multivinyl aromatic compounds, multiepoxides, multiisocyanates, multiimines, multialdehydes, multiketones, multihalides, multianhydrides, multiesters which preferably are the esters of monoalcohols with polycarboxylic acids, and the diesters which are preferably esters of monohydric alcohols with dicarboxylic acids, and the like and mixtures thereof.

Examples of suitable multivinylaromatic compounds include divinylbenzene, 1,2,4-trivinylbenzene, 1,3-divinylnapthalene, 1,8-divinylnaphthalene, 1,3,5-trivinylnaphthalene, 2,4-divinylbiphenyl, and the like. The divinylaromatic hydrocarbons presently are a preferred type, particularly divinylbenzene in either its ortho, meta, or para isomer. Commercial divinylbenzene which is a mixture of the three isomers and other compounds is quite satisfactory.

While any multiepoxide can be used, I prefer those which are liquid since they are more readily handled and form a relatively small nucleus for the radial polymer. Especially preferred among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2;5,6;9,10-triepoxydecane, and the like, also can be used.

Examples of suitable multiisocyanates include benzene-1,2,4-triisocyanate, napthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-aziridinyl)phosphine oxide, tris(2-methyl-1-aziridinyl)phosphine oxide, tris(2-ethyl-3-decyl-1-aziridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde-containing aliphatic and aromatic compounds.

The multiketones can be represented by compounds such as 1,4,9,10-anthracenetetrone, 2,3-diacetonylcyclohexanone, and the like.

Examples of the multianhydrides include pyromellitic dianhydride, styrene-maleic anhydride copolymers, and the like.

Examples of the multiesters include diethyl adipate, triethyl citrate, 1,3,5-tricarbethoxybenzene, and the like.

Among the multihalides, I presently prefer the silicon tetrahalides such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2;4,5-diepoxy-3-pentanone, 1,2;4,5-diepoxy-3-hexanone, 1,2;11,12-diepoxy-8-pentadecanone, 1,3;18,19-diepoxy-7,14-eicosanedione, and the like.

In addition to the silicon multihalides as described hereinabove, other metal multihalides, particularly those of tin, lead, or germanium, also can be readily employed as coupling and branching agents.

Difunctional counterparts of these agents also can be employed, whereby a linear coupled block copolymer rather than a branched block copolymer results.

Broadly, and exemplarily, a range of about 0.01 to 4.5 equivalents of coupling agent are employed per equivalent of polymer-lithium, presently preferred about 0.01 to 1.5 to obtain the desired Mooney viscosity. The larger quantities tend to result in production of polymers containing terminally reactive groups or insufficient coupling. One equivalent of treating agent per equivalent of lithium is considered optimum amount for maximum branching, if this result is desired in the production line. The coupling agent can be added in hydrocarbon solution, e.g., in cyclohexane, to the polymerization admixture in the final reactor with suitable mixing for distribution and reaction.

Polymer Recovery

As is commonly practiced in polymerization processes, it is preferable to add an antioxidant to the effluent from the final reactor to retard potentially deleterious effects of contact with oxygen. A typical antioxidant is 2,6-di-t-butyl-4-methylphenol, and an exemplary amount is in the range of about 0.5 to 1 part by weight per hundred parts monomers.

The reaction mixture is treated to destroy any residual carbon-lithium bonds which may be present and to recover the polymer. The polymer can be precipitated and the remaining lithium moieties, if any, inactivated by the addition of such as a lower alcohol, such as isopropyl alcohol, followed by separation of the product polymer from the polymerization diluent and residue by means such as decantation, filtration, centrifugation, or steam stripping, together with removal of volatiles at reduced pressure and moderate temperature such as about 60° C.

The coupled block copolymers of my invention prepared in accordance with the process of my invention are believed by me to be unique, and to be unusual in their properties. They can be compounded with a variety of ingredients including fillers, dyes, pigments, curing or crosslinking agents, softeners, reinforcing agents, and the like, in various compounding operations.

Most particularly, my coupled block copolymers are desirably employed in adhesive formulations, since I have found that the products exhibit particularly desirable benefits in the way of superior tack and creep resistance upon formulating into adhesive compositions. The polymers are especially useful in hot melt adhesives.

EXAMPLES

To assist in a further understanding of my invention and to note in particular the adhesive properties obtainable in several exemplary compositions, the following examples are intended to assist in an understanding of the invention and are directed to those of skill in the art. Particular species employed, particular conditions, relationships, proportions, and the like, are designed to be illustrative and not limitative of the reasonable scope of my invention and variations thereof.

EXAMPLE I

In a polymerization reactor, 600 parts by weight cyclohexane, and 0.05 parts by weight tetrahydrofuran were charged. Twenty parts by weight of styrene monomer and various amounts of n-butyllithium, as shown below, were charged and allowed to polymerize at 66° C., peaking at 69° C. Then, 80 parts by weight butadiene and the rest of the n-butyllithium were charged and polymerization was allowed to proceed to a final peak temperature of 107° C. A stoichiometric amount of silicon tetrachloride was added as coupling agent and the polymer was recovered, dried, and used for evaluation.

The control Run 1 used the same relative weights of monomers and sequential addition but only a single charge of the initiator, n-butyllithium was used. The resulting polymer control contained no polybutadiene section, the formula (Sty-Bd)$_4$Si representing its structure. Details of the runs and physical properties of the polymers are given on the next page.

TABLE I
80/20 BUTADIENE/STYRENE TELEBLOCK COPOLYMERS WITH INCREMENTAL INITIATOR ADDITION

| Polymer | 1 Control | 2 | 3 | 4 Comparison | 5[e] | 6[d] |
|---|---|---|---|---|---|---|
| NBL, phm | | | | | | |
| 1st | 0.186 | 0.050 | 0.085 | 0.142 | 0.089 | 0.085 |
| 2nd | — | 0.140 | 0.105 | 0.048 | 0.111 | 0.105 |
| THF, phm | 0.05 | 0.05 | 0.05 | 0.05 | 0.05 | 0.05 |
| SiCl$_4$, phm | 0.139 | 0.126 | 0.126 | 0.126 | 0.133 | 0.126 |
| Melt Flow[a] | 0.6 | 0.3 | 0.5 | 0.7 | 0.3 | 0.2 |
| I.V. | 1.16 | 1.06 | 1.00 | 1.03 | 1.07 | 1.10 |
| Styrene, % | 19.7 | 20.9 | 20.4 | 19.4 | 19.3 | 19.3 |
| Polystyrene, % | 18.3 | 18.9 | 18.6 | 18.0 | 18.4 | 18.1 |
| Mu×10$^{-3}$/Mn×10$^{-3}$ | 191/148 | 171/117 | 160/121 | 158/121 | 188/154 | 192/151 |
| Trans, %[b] | 41.1 | 38.4 | 39.6 | 39.8 | 36.0 | 38.1 |
| Vinyl, %[b] | 8.3 | 8.5 | 8.4 | 8.6 | 8.6 | 8.9 |

[a]180° C.; 5 kg.
[b]Microstructure values are based on total polymer weight.
[d]Continuous butadiene addition.
[e]Four batch blend, batches 2–5.

Samples of the polymers prepared as above were compounded in a hot melt pressure sensitive adhesive formulation and tested. The results are given in the table below.

Recipe
(parts by weight)

100 Coupled block copolymer
100 Glycerol ester of Rosin Acid (Foral 85, Hercules)
 40 Coumarone Indene Resin (Cumar LX 504, Neville Chem.)
 60 Extender oil, Naphthenic (Shellflex 361, Shell)
  1 Dilaurylthiodipropionate (DLTDP)
  4 Alkylated, arylated bis-phenolic phosphite (Agerite Geltrol, Vanderbilt Company)

TABLE II
ADHESIVE PROPERTIES OF 80/20 Bd/Sty TELEBLOCKS WITH POLYBUTADIENE BRANCHES

| | Polymer | | | | | |
|---|---|---|---|---|---|---|
| | 1 Control | 2 | 3 | 4 Comparison | 5 | 6 |
| Viscosity at 177° C. (poise) | | | | | | |
| Initial | 33,900 | 78,000 | 18,100 | 27,900 | 25,100 | 32,200 |
| Aged 24 hours | 162,250 | 306,000 | 8,700 | 54,200 | 106,500 | 75,500 |
| Holding Power, Hours to 1/16 in. failure | | | | | | |
| 60° C.; 1 lb. wt. | 0.2 | >24 | 15 | 0.4 | >24 | >24 |
| Polyken Probe Tack, grams | | | | | | |
| Immediate | 837 | 1,206 | 1,220 | 863 | 1,183 | 1,223 |

Comparative Run 4 is no better than the control Run 1 and clearly demonstrates the importance of dividing the initiator into unequal parts with the smaller fraction being used initially. The data for Runs 2, 3, 5, and 6, show that incremental addition of initiator provides improved tack and holding power and improved heat stability. Even the blend (Run 5) composed of four batches shows improvement over the control (Run 1). Run 6 was polymerized under condition of continuous butadiene addition but with fresh initiator added after all the styrene had polymerized. The net result of continuous addition is that the polybutadiene block has a broader molecular weight distribution. The effect on adhesive properties appeared to be negligible.

As can be realized from my discussions hereinabove, my polymeric product produced in accordance with my process is not a single structure, but actually represents an unusual, unique, and unobvious composition which will be an admixture of several types of structure. Utilizing styrene as a typical monovinyl arene, butadiene as a typical conjugated diene, silicon as a residue from a silicon-based coupling agent, and assuming that the coupling agent is effectively tetrafunctional, the following are representative of the types of structure in a coupled radial block copolymer that would be present in the total polymeric produced in accordance with the process of my invention:

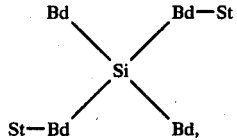

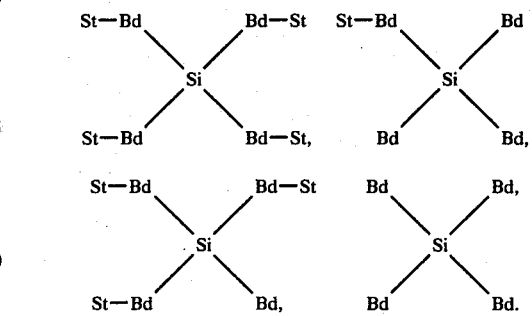

Bd = block of poly(conjugated diene) such as polybutadiene.
St = block of poly(monovinylarene) such as polystyrene.

In the adhesive formulations in accordance with one aspect of my invention, these compositions include, in addition to the coupled block copolymer as described, tackifier, plasticizer, stabilizer, and diluent, to the extent desired and preferable for particular compositions.

To those skilled in the art, adhesive formulations generally will contain various ingredients in amounts similar to those given in the following recipe:

| Recipe | |
|---|---|
| Component | Parts by Weight |
| Coupled block copolymer | 100 |
| Tackifier | 40–150 |
| Plasticizer | 0–100 |
| Stabilizer | 0.1–5 |
| Solvent when employed | 75–2,000 |
| Water when employed | 5–250 |

Exemplary tackifiers include any of the resinous substances known in the art for enhancing tack of adhesive compositions. Examples of such tackifiers include rosin, rosin derivatives, polyterpene resins, phenolic resins, coumarone-indene resins, and the like, alone, or in admixture.

Any of the plasticizers known in the adhesives arts can be employed in accordance with my adhesive formulations. Such plasticizers include the extender oils, aromatic, paraffinic, or naphthenic, as well as a variety of liquid polymers and copolymers employed as plasticizers such as liquid polybutene, liquid polybutadiene, and the like.

Stabilizers usually are employed in adhesive formulations in order to inhibit degradation of the adhesive due to exposure to heat, light, oxygen, ozone, and the like. Examples of such stabilizers, useful in my formulations in accordance with my adhesive compositions, include the hindered phenols, phosphites, phenolic phosphites, thiodicarboxylate esters, and the like, alone, or in admixture.

The adhesives of my invention can be applied to substrates in the form of solutions, emulsions, dispersions, or as a hot-melt. As solutions, the formulations can conveniently be contained in hydrocarbon solvents such as n-hexane, cyclohexane, benzene, toluene, and mixtures thereof. As emulsions, or dispersions, suitable carriers, such as water, and suitable emulsifiers, such as dialkyl sodium sulfosuccinate, or sodium alkylaryl polyether sulfonate, can be employed in the formulations.

Of course, it may be desirable to include such materials as pigments, wetting agents, curatives, reinforcing agents, and fillers, to the adhesive formulations.

The disclosure, including data, illustrate the value and effectiveness of my invention. The examples, the knowledge and background of the field of the invention and of general principles of chemistry and of other applicable sciences have formed the bases from which the broad descriptions of the invention including the ranges of the conditions, and generic ranges of operant components have been developed, which have formed the bases for my claims here appended.

I claim:

1. The process for the preparation of a coupled block copolymer which comprises the steps of polymerizing a first monomer selected from monovinyl aromatic hydrocarbons under solution polymerization conditions employing a hydrocarbon diluent, a first effective increment of a hydrocarbylmonolithium initiator, at effective conditions of temperature, pressure, and time, adding to the still-living polymerization admixture resulting therefrom at least one second monomer selected from conjugated dienes, together with a second effective increment of a hydrocarbyllithium initiator, provided that said second initiator increment is greater than said first initiator increment, and continuing said polymerization, and thereafter treating the resulting polymerization admixture with an effective amount of a coupling agent which is at least difunctional, thereby producing a mixture of coupled block copolymers exhibiting effective properties in adhesive formulations.

2. The process according to claim 1 wherein said monovinyl aromatic hydrocarbon contains 8 to 12 carbon atoms per molecule, and said conjugated diene contains 4 to 8 carbon atoms per molecule.

3. The process according to claim 2 wherein said solution polymerization conditions include a polymerization temperature in the range of about $-20°$ C. to $150°$ C., and a pressure sufficient to maintain reactants and diluents substantially in the liquid phase.

4. The process according to claim 3 wherein said hydrocarbyllithium initiator is employed in a range of about 0.001 to 3 phm in each of said first initiator addition and second initiator addition.

5. The process according to claim 4 wherein said polymerization of said first monomer is conducted in the further presence of a polar organic compound in the range of about 0.001 to 10 phm.

6. The process according to claim 4 employing a weight ratio of said conjugated diene:monovinyl aromatic hydrocarbon in the range of about 50:50 to 95:5.

7. The process according to claim 6 wherein said monovinyl aromatic hydrocarbon is styrene, 1-vinylnaphthalene, 2-vinylnaphthalene, 3-methylstyrene, or 4-propylstyrene; and said conjugated diene is 1,3-butadiene, isoprene, 2,3-dimethyl-1,3-butadiene, piperylene, 1,3-hexadiene, 3,4-dimethyl-1,3-hexadiene, or 1,3-octadiene.

8. The process according to claim 7 employing a weight ratio of said conjugated diene:monovinyl aromatic hydrocarbon in the range of about 85:15 to 70:30, wherein said monovinylarene is styrene, and said conjugated diene is butadiene.

9. The process according to claim 8 wherein said hydrocarbyllithium initiator is n-butyllithium, said organic polar compound is tetrahydrofuran, and said ratio is about 80 butadiene:20 styrene, and wherein said coupling agent is silicon tetrachloride.

10. The process according to claim 4 wherein the amount of said hydrocarbyllithium initiator added as said second initiator amount is at least about 1 percent by weight to 400 percent by weight greater than the amount added as said first initiator amount.

11. The process according to claim 4 wherein said polymerization employs said hydrocarbyllithium initiator in a range of about 0.01 to 0.3 phm in said first initiator increment, and about 0.01 to 0.3 in said second initiator increment, with a proviso that said second increment is greater than said first increment by at least about 0.01 phm.

12. The process according to claim 1 wherein said coupling agent is a multivinyl aromatic compound, multiepoxide, multiiscocyanate, multiimine, multialdehyde, multiketone, multihalide, multianhydride, multiester as the ester of a polyalcohol with a monocarboxylic acids, or diester as the ester of a monohydric alcohol with a dicarboxylic acid, or mixtures.

13. The process according to claim 12 wherein said coupling agent is a multihalide and is a silicon halide.

14. The process according to claim 12 employing about 0.01 to 4.5 equivalents of coupling agent per equivalent of polymer-lithium.

15. The copolymeric product produced by the process which comprises the steps of polymerizing a first monomer selected from monovinyl aromatic hydrocarbons under solution polymerization conditions employing a hydrocarbon diluent, a first effective increment of a hydrocarbylmonolithium initiator, at effective conditions of temperature, pressure, and time,
adding to the still-living polymerization admixture resulting therefrom at least one second monomer selected from conjugated dienes, together with a second effective increment of a hydrocarbyllithium initiator, provided that said second initiator increment is greater than said first initiator increment, and continuing said polymerization,
and thereafter treating the resulting polymerization admixture with an effective amount of a coupling agent which is at least difunctional, thereby producing a mixture of coupled block copolymers exhibiting effective properties in adhesive formulations.

16. The adhesive composition employing 100 parts by weight of coupled block copolymer, about 40–150 parts tackifier, up to 100 parts plasticizer, 0.1–5 parts stabilizer, optionally employing solvent in the range of 75–2000 parts or water in the range of about 5–250 parts,
wherein said coupled block copolymer is the copolymeric product prepared by the process which comprises the steps of polymerizing a first monomer selected from monovinyl aromatic hydrocarbons under solution polymerization conditions employing a hydrocarbon diluent, a first effective increment of a hydrocarbylmonolithium initiator, at effective conditions of temperature, pressure, and time,
adding to the still-living polymerization admixture resulting therefrom at least one second monomer selected from conjugated dienes, together with a second effective increment of a hydrocarbyllithium initiator, provided that said second initiator increment is greater than said first initiator increment, and continuing said polymerization,
and thereafter treating the resulting polymerization admixture with an effective amount of a coupling agent which is at least difunctional, thereby producing a mixture of coupled block copolymers exhibiting effective properties in adhesive formulations.

17. The adhesive composition of claim 16 wherein said copolymer is a butadiene/styrene block copolymer.

18. The adhesive composition of claim 17 wherein said copolymer is an 80/20 butadiene/styrene block copolymer.

19. The adhesive composition according to claim 18 employing about 100 parts said coupled block copolymer, about 100 parts glycerol ester of rosin acid, 40 parts coumarone-indene resin, 60 parts extender oil, 1 part dilaurylthiodiproprionate, 4 parts alkylated arylated bis-phenolic phosphite.

20. A copolymer as defined by claim 15 wherein a tetrafunctional silicon based coupling agent is employed, and the resulting copolymer product is an admixture comprising species represented by

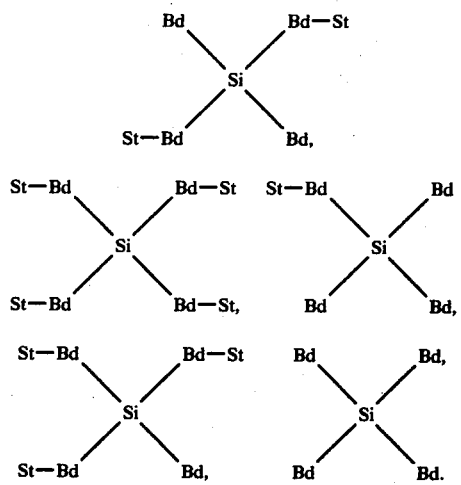

wherein Bd represents a block of poly(conjugated diene), and St a block of poly(monovinyl arene).

21. The process for the preparation of a coupled block copolymer which comprises the steps of polymerizing a first monomer selected from monovinyl aromatic hydrocarbons under solution polymerization conditions employing a hydrocarbon diluent, a first effective increment of a hydrocarbylmonolithium initiator, at effective conditions of temperature, pressure, and time,
adding to the still-living polymerization admixture resulting therefrom at least one second monomer selected from conjugated dienes, together with a second effective increment of a hydrocarbyllithium initiator, provided that said second initiator increment is greater than said first initiator increment, and continuing said polymerization,
and thereafter treating the resulting polymerization admixture with an effective amount of a coupling agent which is at least trifunctional, thereby producing a mixture of coupled block copolymers.

22. The copolymeric product produced in accordance with the process which comprises the steps of polymerizing a first monomer selected from monovinyl aromatic hydrocarbons under solution polymerization conditions employing a hydrocarbon diluent, a first effective increment of a hydrocarbylmonolithium initiator, at effective conditions of temperature, pressure, and time,
adding to the still-living polymerization admixture resulting therefrom at least one second monomer selected from conjugated dienes, together with a second effective increment of a hydrocarbyllithium intiator, provided that said second initiator increment is greater than said first initiator increment, and continuing said polymerization,
and thereafter treating the resulting polymerization admixture with an effective amount of a coupling agent which is at least trifunctional, resulting in an admixture comprising radial coupled block polymers.

23. The adhesive composition employing 100 parts by weight of coupled block copolymer, about 40–150 parts tackifier, up to 100 parts plasticizer, 0.1–5 parts stabilizer, optionally employing solvent in the range of 75–2000 parts or water in the range of about 5–250 parts, wherein said coupled block copolymer is prepared by the process which comprises the steps of polymerizing a first monomer selected from monovinyl aromatic hydrocarbons under solution polymerization conditions employing a hydrocarbon diluent, a first effective increment of a hydrocarbylmonolithium initiator, at effective conditions of temperature, pressure, and time, adding to the still-living polymerization admixture resulting therefrom at least one second monomer selected from conjugated dienes, together with a second effective increment of a hydrocarbyllithium initiator, provided that said second initiator increment is greater than said first initiator increment, and continuing said polymerization, and therafter treating the resulting polymerization admixture with an effective amount of a coupling agent which is at least trifunctional, thereby producing a mixture of coupled block copolymers.

24. The adhesive composition of claim 23 wherein said copolymer is a butadiene/styrene block copolymer.

25. The adhesive composition of claim 24 wherein said copolymer is an 80/20 butadiene/styrene block copolymer.

26. The adhesive composition according to claim 25 employing about 100 parts said coupled block copolymer, about 100 parts glycerol ester of rosin acid, 40 parts coumarone-indene resin, 60 parts extender oil, 1 part dilauryl thiodipropionate, 4 parts alkylated arylated bis-phenolic phosphite.

27. An article of manufacture formed of at least two parts bonded with the adhesive composition of claim 23.

28. An article of manufacture formed of at least two parts bonded with the adhesive composition of claim 16.

* * * * *